United States Patent [19]

Taube et al.

[11] 4,176,931

[45] Dec. 4, 1979

[54] CAMERA TO MICROSCOPE ADAPTER SYSTEM WITH PERIPHERAL IMAGE AVERAGING MEANS FOR EXPOSURE CONTROL

[76] Inventors: John Taube, 2130 NW. 31st Ave., Apt. F-6; Andris Taube, 1901 NW. 38th Dr., both of Gainesville, Fla. 32605

[21] Appl. No.: 910,697

[22] Filed: May 30, 1978

[51] Int. Cl.² .................. G03B 17/48; G02B 21/00
[52] U.S. Cl. .................................. 354/79; 350/19
[58] Field of Search ............... 354/79; 350/17-19

[56] References Cited

U.S. PATENT DOCUMENTS

| | | | |
|---|---|---|---|
| 1,573,401 | 2/1926 | Heine | 350/19 X |
| 3,292,490 | 12/1966 | Moore | 350/19 X |
| 3,721,170 | 3/1973 | Johnson | 354/79 X |
| 3,872,303 | 3/1975 | Jakubowski et al. | 354/79 X |
| 3,898,678 | 8/1975 | Walworth | 354/79 |
| 3,900,858 | 8/1975 | McCann et al. | 354/79 |
| 3,976,368 | 8/1976 | McCann et al. | 350/19 X |

Primary Examiner—Donald A. Griffin
Attorney, Agent, or Firm—LoPucki & LoPucki

[57] ABSTRACT

The invention involves an adapter with peripheral image averaging means for exposure control or attaching an automatic exposure control camera or camera with an exposure meter to a microscope for the purpose of photographing the material on the microscope stage. The adapter uses a separating element which divides the magnified image into the part which completely fills the camera's rectangular film format allowing it to pass to the film without appreciable interference and the remaining part, the peripheral image, which the separating element collects and directs toward the camera's automatic exposure control port where a reflector aims the extracted second part of the magnified image onto a translucent screen in front of the camera's exposure control port.

8 Claims, 6 Drawing Figures

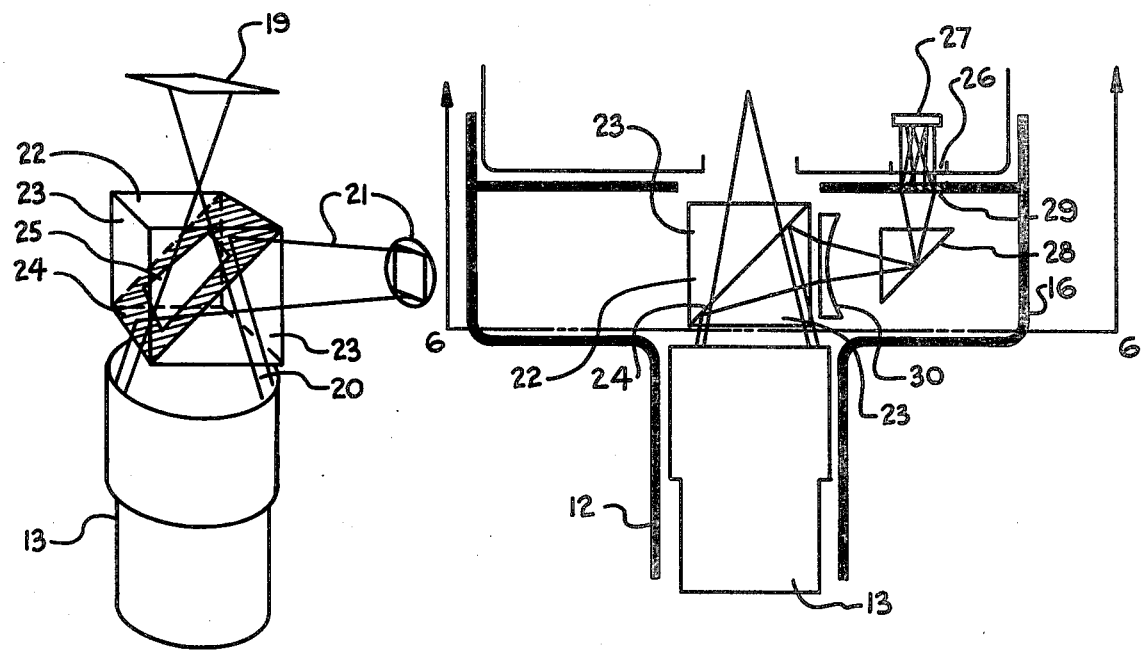
FIG. 3
FIG. 4
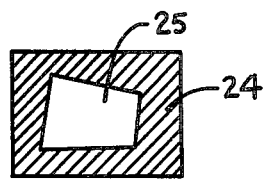
FIG. 5
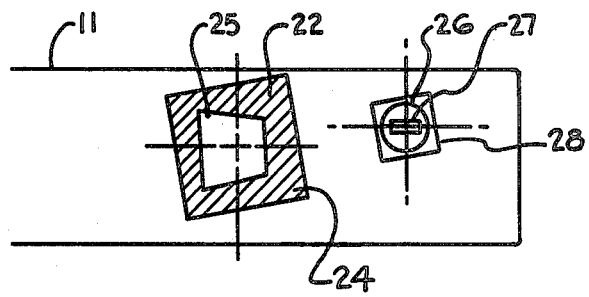
FIG. 6

CAMERA TO MICROSCOPE ADAPTER SYSTEM WITH PERIPHERAL IMAGE AVERAGING MEANS FOR EXPOSURE CONTROL

BACKGROUND OF THE INVENTION

1. Field of Invention

The invention is useful in an adapter for connecting a self-contained camera with automatic exposure control or a light meter to an image-forming optical system, such as a microscope. The system directs the portion of the image outside of the film format to the exposure control port of the camera so that the light needed for the picture is not appreciably reduced while at the same time providing as much light as possible to the camera's automatic exposure control mechanism.

2. Description of Prior Art

Prior art adapters for coupling automatic exposure control cameras to optical instruments have been designed to remove light from the image-forming instrument, which would normally lie outside of the film format in the camera for use in operating the camera's automatic exposure control mechanism. Typical of these devices are those shown in U.S. Pat. Nos. 3,898,678; 3,900,858; and 3,976,368. The complexity of and number of operative elements in the devices described in these patents result in unnecessarily high production costs and difficulty in operating the adjustable peripheral light extracting means during the photographing process. An extremely important limitation of the prior art devices is that they disclose structure capable of withdrawing only portions of the light from the image-forming instrument which lie outside of the film format of the camera for use in activating the exposure control mechanism within the camera. This can be ineffective in part, because the intensity of light being measured by such a device may not be indicative of the intensity of light received from the object being photographed. The operator in these situations is required to adjust the light extracting device to both maximize the amount of light being extracted from the periphery of the photographic field and, to the extent possible, find a representative light intensity within that peripheral image. Further, there is quite often inadequate light eminating from the object to be photographed to operate the camera's exposure control mechanism without either recalibration of the camera's system from its design range or increasing the intensity of light on the subject being photographed, which can have negative effects both on the object being photographed and the appearance of the image being focused within the camera format.

One of the problems dealt with in the prior art is that the camera with which the adapter and exposure control device must work is often the SX-70 Land Camera, which has an exposure control port located both laterally and vertically from the center of the camera's front lens when viewing the camera from the front. This has resulted in the complex structure typified by U.S. Pat. No. 3,976,368. Furthermore, this camera ejects the finished picture to the front of the camera when developed, and accordingly, the adapter and exposure control device involved must be compact and out of the way of the operating mechanism.

SUMMARY OF THE INVENTION

The invention involves a camera to microscope adapter which separates the magnified image into the part of the image which fills the camera's film format and the remaining portion which is collected and reflected to the camera's exposure control mechanism. A separating element fastened to the adapter is positioned to intercept the entire cone of the magnified image projecting from the microscope's eyepiece. This separating element has a reflective surface which is oriented to reflect the light striking it to a position in front of the camera's exposure control port where the light is reflected into the exposure control port. The reflective surface on the separating element has a format opening which is shaped so as to permit only that portion of the magnified image which will fill the camera's rectangular film format to pass through the reflective surface. The result is that virtually all of the light lying outside of the film format is deflected to the camera's exposure control device or light meter, thereby operating the exposure control device with an averaged peripheral image made up of the light intensities outside the film format.

One of the principal objectives of the subject invention is to provide a camera to microscope adapter which utilizes virtually all of the focused image from the microscope lying outside of the camera's film format to activate the camera's exposure control meter. The inherent advantages of this are that the light actuating the exposure control is an average of the peripheral image to indicate to the camera exposure control mechanism a more representative light intensity and the overall intensity of the light entering the exposure control mechanism is more likely to be within the range for which the camera's exposure meter is generally designed to operate. As a result, the camera does not have to be recalibrated or modified with regard to light sensitivity in order to use it for photomicroscopy.

Another advantage of the subject invention is that, relative to the prior art, the components are simple and less expensive to fabricate, and when mounted in the adapter, do not require adjustment as to position, thereby minimizing manufacturing costs and complexities while improving reliability as a result of the elimination of moving parts.

A further advantage of the subject invention is that the magnified image passes only through optical quality glass, thereby making the adapter compatible with very high quality microscopes.

Yet another advantage is that the small number of parts required by the invention enable the adapter to be minimized in size, thereby making it possible to firmly mount the camera to the microscope without interfering with the normal functions of the camera, such as focusing and picture ejection. In addition, the relatively compact adapter is reduced in size enough so that it will fit comfortably on a monocular microscope, as well as a minocular or trinocular microscope.

An inherent advantage of the invention is the fact that, when photographing on a binocular microscope, the microscopist is working with only half of the light from the subject. Accordingly, the amount of light available to activate the exposure meter is cut in half, and devices from the prior art utilizing less than all of the peripheral light tend to be below the low end of the operating range of the camera's exposure control mechanism.

Although the adapter system has been described for use with the SX-70 Land Camera, the system can also be used with other cameras including cameras using an internal light meter instead of the automatic exposure control of the Land Camera.

DESCRIPTION OF THE DRAWINGS

The functioning and advantages of the present invention can be more clearly understood and better appreciated by reference to the following detailed description in conjunction with the accompanying drawings, wherein:

FIG. 3 shows an isometric view of the separating element inside the adapter system to show how the separating element intersects and divides the magnified image from the microscope eyepiece.

FIG. 4 shows a cross-sectional view through the optical elements of the adapter system to further show the two paths of the light within the adapter system.

FIG. 5 shows a view perpendicular to the plane of the reflective surface on the separating element and the shape of the format opening in that reflective surface.

FIG. 6 shows the separating element in front of the camera to show the manner in which the peripheral image used for exposure control is directed to the exposure control port.

THE PREFERRED EMBODIMENT OF THE INVENTION

Figure 1:
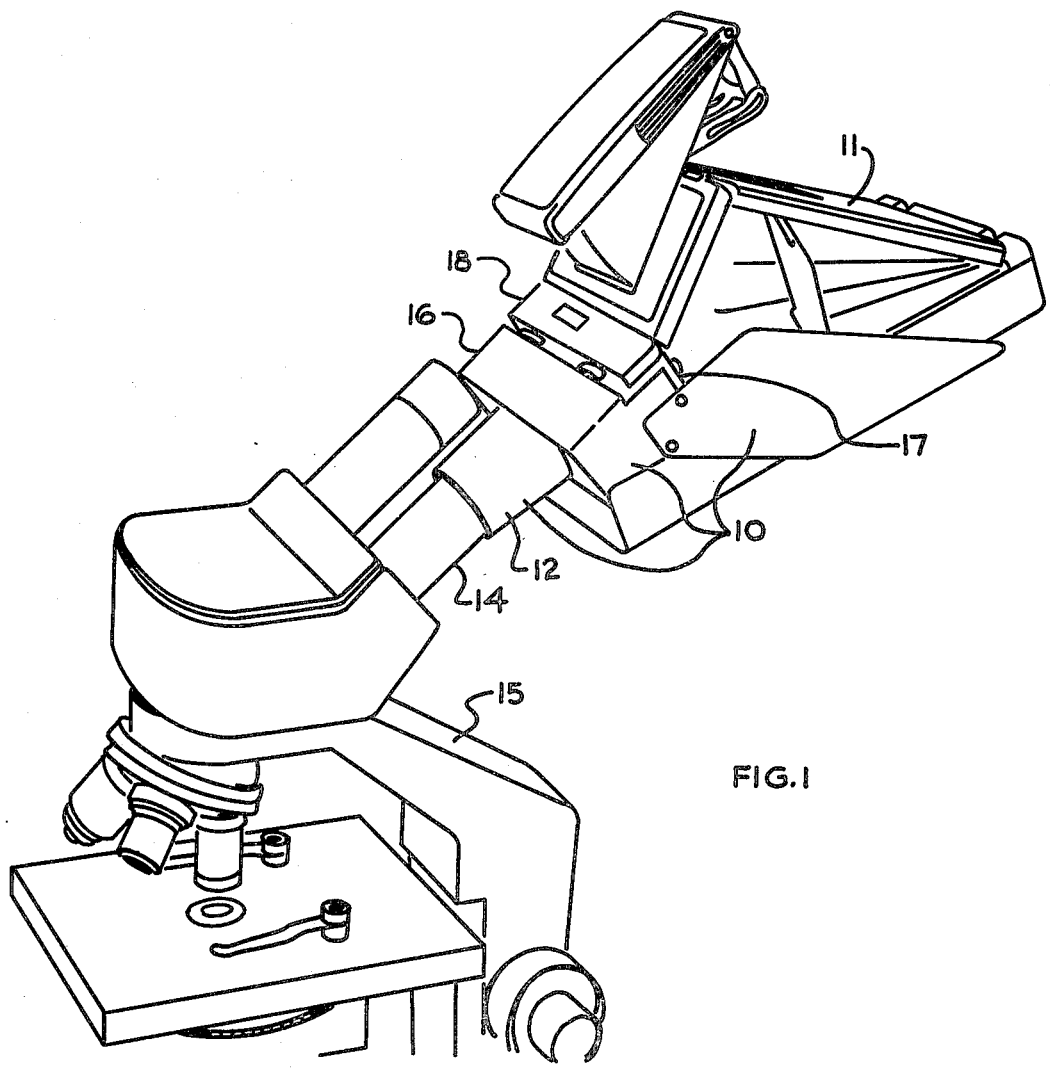
FIG. 1 shows an automatic exposure control camera mounted on the eye tube of a typical binocular microscope.

FIG. 1 shows the adapter system 10 holding an SX-70 Land Camera 11. The adapter system 10 has a mounting tube 12 projecting from the front of the adapter system 10, which slides over a commonly available eyepiece 13, which itself slides into the eye tube 14 of a microscope 15. The mounting tube 12 is fixed rigidly in the adapter housing 16 and is sized and shaped to coaxially align itself with the eye tube 14 and eyepiece 13 when it is in place over the eye tube 14 and eyepiece 13. The adapter housing 16 is firmly held in place over the eyepiece 13 by set screws in the mounting tube 12.

The camera 11 is then fastened to the adapter system's housing 16 by clips 17 which connect the camera's lens/exposure mechanism housing 18 to the adapter housing 16.

The problem to which the invention is directed is that the brightness of the image being photographed through the microscope is often limited by practical considerations, and accordingly, it is desirable to produce the photograph without losing any of the light within the boundaries of the film.

Figure 2:
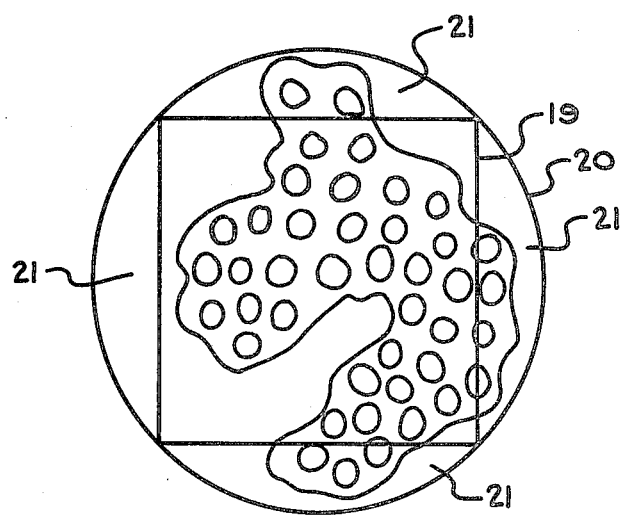
FIG. 2 illustrates a rectangular film format superimposed on a circular image from a microscope, showing four quarter segments of the image (hereafter peripheral image) outside of the film format.

The problem can be better understood by reference to FIG. 2, which shows the view on a plane where the camera's film is positioned passing through the focused image 20 (cone of light) received from the microscope. The usual rectangular film format 19 is shown within the circular focused image 20 leaving four segments of a peripheral image 21 which lies outside the film format 19. The subject invention separates from the cone of light virtually the entire peripheral image 21 without disturbing the portion of the focused image which ultimately is received within the film format 19. The three patents referred to above as indicative of the prior art, disclose means for extracting portions of the peripheral image segments 20, but do not suggest physical structure for dividing out, directing, and averaging virtually all of the peripheral image 21 for the camera's automatic exposure control mechanism.

FIGS. 3 and 4 show the optical elements of the adapter system 10 which separate the focused image 20 into the two desired components. The separating element 22 is shown in the preferred embodiment as an optical quality cube formed of two 45° prisms 23 cemented together with optical quality cement to form a cube. The separation of the focused image 20 into the desired components is achieved by application of a reflective surface 24 to one of the hypotenuse faces of the 45° prisms 23 which are cemented together to form the cube. The reflective surface 24 in the preferred embodiment is vapor plated aluminum and is applied to leave a format opening 25 further described below.

The separating element 22 is rigidly mounted in the adapter housing 16 adjacent to the mounting tube 12 so that the plane of the reflective surface 24 completely cuts across the cone of the focused image 20 above the eyepiece 13 below the apex of the cone of the focused image 20. The preferred embodiment of the invention avoids distortion of the portion of the focused image 20 within the film format 19 by orienting the separating element 22 so that all of the light passing through to the film format 19 travels the same distance in the separating element. This is done by placing the bottom and top surfaces of the cube shaped separating element 22 perpendicular to the direction of travel of the focused image 20 received from the eyepiece 13.

As shown in FIG. 3, the focused image 20 is divided at the reflective surface 24 into the portion passing through the format opening 25 in the reflective surface which strikes the film in the camera within the film format 19 and the peripheral image 21 which is reflected laterally within the adapter housing toward the camera's exposure control port 26.

The 45° angle for the reflective surface 24 offers a good balance of goals as a more vertical plane while helping by directing the peripheral image 21 closer to the exposure control port 26 limits the range of eyepieces 13 which can be used and still have the cone of light received from the eyepiece completely intercepted by the reflective surface 24 before it converges at its apex. A lower angle than 45° causes elements of the adapter system to interfere with the adapter housing 16.

As can be seen in FIG. 6 taken along line 6—6 in FIG. 4 looking at the separating element 22 oriented in front of the camera 11, the exposure control mechanism 27 is located above the axis of the separating element 22, and accordingly the peripheral image 21 must be directed in this direction. This is very simple accomplished by rotating the separating element 22 about its vertical axis as viewed in FIG. 3, thereby avoiding additional elements or reflective surfaces.

Once the factors controlling the orientation of the separating element have been provided for, the shape of the format opening 25 in the reflective surface 24 can be established. FIG. 5 is a view of the format opening 25 in the reflective surface 24 looking directly at the reflective surface. The view shows a format opening 25 which is an irregular shaped trapezoid. The trapezoidal shape and size of the format opening 25 is set so that the portion of the focused image 20 passing through the reflective surface 24, forms the largest rectangular image possible within the film format 19 which can be obtained from the conical focused image 20. The result, as shown in FIG. 3, is that virtually the entire peripheral image 21 strikes the reflective surface 24 surrounding the format opening 25 and is reflected toward the exposure control port 26.

As can be seen, the separating element 22 combines its unique format opening, reflective surface and orientation to efficiently and reliably separate the focused image into the undisturbed portion striking the film format 19 and the peripheral image 21, which is collected and used to operate the exposure control mechanism 27 of the camera 11.

FIG. 4 shows a reflector prism 28 mounted in the adapter housing 16 to reflect the peripheral image 21 received from the separating element 22 to a translucent screen 29 which is located immediately in front of the camera's exposure control port 26. A translucent screen 29 receives the peripheral image 21 from reflector prism 28, helps mix and average the peripheral image 21 and display it to the camera's exposure control mechanism 27.

The preferred embodiment of the invention also incorporates a diverging lens 30 in FIG. 4 located between the separating element 22 and the reflector prism 28 which extends the point of convergence of the peripheral image 21 beyond the reflector prism 28 thereby avoiding unwanted divergence after the eye point of the eyepiece and loss of the peripheral image 21.

The adaptor housing 16 as shown in FIG. 4 holds the components in position while completely sealing the system from outside dust. The housing also minimizes reflections inside the housing. Accordingly, an inherent advantage to the separating element 22 being a cube as opposed to a reflective plane with a hole for a format opening is that it is more easily mounted in the adapter housing 16 so as to keep dust out of the system and minimize reflections.

It is also important in the market for an adapter system to accommodate a commercially available camera, such as the SX-70 Land Camera, and adapt the camera for use on any of the various commercially available microscopes without interfering with the independent use of either the camera or the microscope. The subject invention achieves this objective by simplifying and physically minimizing the necessary image separating components, so that the adapter housing 16 can be reduced in size enough to fit over the eye tube of most microscopes without interfering with the binocular or trinocular eye tubes of these scopes, and also without interfering with the functions of the camera, such as focusing knobs and process film ejection.

Other variations of the invention are possible in light of this disclosure, and it will be apparent to those skilled in the art that modifications of the suggested elements may be made to suit design requirements without departing from the spirit and scope of the invention. Accordingly, the scope of the claims below could be practiced with elements differing in degree and not kind from those specified herein.

What is claimed is:

1. In a camera to microscope adapter system of the type that extracts a part of the focused image received from said microscope to operate an exposure control mechanism for said camera having in combination an adapter housing which fastens and aligns said camera to said microscope, means located within and held in place by said adapter housing to separate said part of said focused image and redirect said part of said focused image, and conventional collecting and directing means also connected to said adapter housing which receive and deliver said part of said focused image to said exposure control mechanism, the improvement in said means to separate said part of said focused image for exposure control comprising:

A reflective surface encased within and held in place by said adapter housing, said reflective surface being positioned to cut through the right angle cone of light formed by said focused image below the apex and other than parallel to the base of the cone, said reflective surface being further positioned to direct all parts of said focused image which strike said reflective surface to said conventional collecting and directing means which deliver said parts of said focused image to said exposure control mechanism, said reflective surface having a format opening through said reflective surface which is geometrically defined by the location of said reflective surface relative to said camera and said right angle cone of light to permit only a film format portion of said focused image which falls within the boundaries of the film within said camera to pass through said format opening whereby the remaining peripheral image outside of said format opening strikes said reflective surface, and is directed to said exposure control mechanism.

2. The adapter system claimed in claim 1 wherein said reflective surface is sandwiched between two forty-five (45) degree optical prisms on the hypotenuse faces of said prisms, said prisms being bonded together to form a cube which supports said reflective surface and holds said reflective surface in its defined position within said adapter housing, said cube and said reflective surface being further positioned so that the two faces of said cube through which said focused image passes are perpendicular to the line of travel of said focused image.

3. A camera to microscope adapter system which extracts part of the focused image received from said microscope to operate an exposure control mechanism for said camera comprising:

a. An adapter housing which attaches firmly to said camera and also attaches firmly to an eye tube of said microscope to align said camera's optic axis with said microscope's optic axis, b. A separating element attached to and located within said adapter housing located along said microscope's optic axis having a reflective surface positioned to cut through the entire right angle cone of light formed by said focused image below the apex and other than parallel to the base of said cone, thereby diverting the light striking said reflective surface from said optic axis of the camera and focused image, said reflective surface having a format opening through said reflective surface which is geometrically defined by the location of said reflective surface relative to said camera and said right angle cone of light formed by said focused image to permit only a film format portion of said focused image which falls within the boundaries of the film within said camera to pass through said format opening whereby the remaining peripheral image portion of said focused image outside of said format opening is reflected by said reflective surface from said camera's optic axis, and c. A reflector prism having a second reflective surface located within and held in place by said adapter housing at a position to collect said peripheral image from said separating element and reflected to said exposure control mechanism of said camera.

4. The adapter system claimed in claim 3 wherein said separating element is comprised of a cube formed from two forty-five (45) degree optical prisms bonded together on said prisms' hypotenuse faces wherein said reflective surface is sandwiched between said two forty-five (45) degree optical prisms and said cube is oriented within said adapter housing to retain the defined position of said reflective surface 5. The adapter system claimed in claim 4 wherein said cube is held in place by said adapter housing by attachment to a face of said cube nearest said microscope and at the opposite face of said cube completely enclosing said cube but for two ports at the faces of said cube closest to said camera and said microscope whereby light may enter said adapter housing only through the exposed faces of said cube.

6. The adapter system claimed in claim 4 wherein the orientation of said cube is further limited to fix said cube within said adapter housing so that two opposite faces of said cube are perpendicular to the optical axis of said camera and said microscope.

7. The adapter system claimed in claim 4 wherein said reflector prism is located directly outside and along the optical axis of said exposure control mechanism and said cube is located about the optical axis of said camera and microscope and fixed in position to direct said peripheral image to said reflector prism being further oriented to direct said peripheral image into said exposure control mechanism.

8. The adapter system claimed in claim 7 wherein a translucent screen is inserted between said reflective prism and said exposure control mechanism and held in place by said adapter housing whereby said peripheral image strikes said translucent screen and is further averaged in light intensity for display to said exposure control mechanism.

* * * * *